United States Patent [19]

Milazzo et al.

[11] 3,791,510

[45] Feb. 12, 1974

[54] ACCUMULATING CONVEYOR

[75] Inventors: Carl J. Milazzo, Tonawanda; Frank J. Hohl, Snyder, both of N.Y.

[73] Assignee: Hohl Machine & Conveyor Co., Inc., Buffalo, N.Y.

[22] Filed: Dec. 23, 1971

[21] Appl. No.: 211,351

[52] U.S. Cl. ............................ 198/127 R, 198/173
[51] Int. Cl. ............................................. B65g 13/02
[58] Field of Search ............................ 198/127, 173

[56] References Cited
UNITED STATES PATENTS
2,253,198  8/1941  Regan ............................ 198/127 R
2,990,941  7/1961  Peras ................................... 198/173
3,650,376  3/1972  Burgis et al. ......................... 198/160

FOREIGN PATENTS OR APPLICATIONS
697,901  9/1953  Great Britain .................. 198/127 R Primary Examiner—Evon C. Blunk
Assistant Examiner—Joseph E. Valenza
Attorney, Agent, or Firm—Christel & Bean

[57] ABSTRACT

A series of live rollers have reduced diameter portions centrally thereof forming grooves receiving and guiding an endless drive member having one side in frictional contact therewith. The drive member thickness is less than the roller groove depth and spaced pads on the drive member project slightly above the article engaging surfaces of the rollers to engage the trailing edge of a stationary load and initiate forward movement thereof.

7 Claims, 5 Drawing Figures

INVENTORS
FRANK J. HOHL
BY CARL J. MILAZZO

Christel & Bean
ATTORNEYS

ACCUMULATING CONVEYOR

BACKGROUND OF THE INVENTION

This invention relates generally to the conveyor art and, more particularly, to a new and useful accumulating and transfer conveyor of the live roller type.

Conventional accumulating conveyors of the live roller type are often driven by an endless belt maintained in frictional engagement with either the under surfaces or the upper surfaces of the rollers. Sometimes, an improperly oriented load or a load pile-up occurs somewhere along the conveyor upstream of the accumulating area and the normal frictional force of the drive belt against the rollers isn't sufficient to overcome the static or stationary load on the rollers and the latter slip relative to the stationary load. In an effort to initiate movement of a stationary load without unduly increasing the hold-back force for accumulation in those arrangements where the endless belt engages the under surfaces of the rollers, a pad is sometimes used in conjunction with the belt. However, the pad moves in a direction opposite that of the conveyed article whereby the load is only indexed a short distance commensurate with the length of the pad.

In those known arrangements where the belt engages the upper surfaces of the rollers, the belt is located at one side of the conveyor and is relatively narrow to allow room for the loads to be conveyed, thus limiting the drive capacity of the belt. Accordingly, weights or other means sometimes are employed to press the belt against the rollers to increase the frictional engagement therebetween to maintain movement of the conveyed articles and to initiate movement of static loads. These arrangements have the disadvantage that a constant friction force is produced along the length of the conveyor, requiring a relatively large hold-back force for accumulation with the resulting possibility of damage to the products being accumulated and an increase in belt driving requirements. Moreover, the superstructure associated with the drive belt impedes access to the conveyor from that side.

SUMMARY OF THE INVENTION

A primary object of the present invention is to provide an accumulating conveyor of the belt-driven, live roller type which obviates the above disadvantages and which requires only a minimum of hold-back force for accumulation of the product being conveyed.

The apparatus of the present invention, as hereinafter described, obviates the prior art disadvantages by providing an accumulating conveyor having live rollers with reduced diameter portions centrally thereof for receiving an endless drive member of sufficient width and weight frictionally engagable with such reduced diameter portions normally to maintain the forward motion of the product being conveyed, and which includes means on the drive member for engagement with a stationary load to initiate movement of the latter along the conveyor.

The drive belt is of a thickness less than the depth of such grooves, and can be of very substantial width without interfering with the conveying area of the conveyor. Thus, more space is available on the rollers for conveying loads and both sides of the conveyor are accessible for the placement of loads on or the removal thereof from the conveyor.

Various other novel features of construction and advantages provided by the conveyor construction of the present invention are pointed out in the following detailed description of an illustrative embodiment thereof considered in conjunction with the accompanying drawing depicting the same wherein like numerals represent like parts throughout the various views.

BRIEF DESCRIPTION OF THE DRAWING FIGURES

DETAILED DESCRIPTION OF AN ILLUSTRATIVE EMBODIMENT

Figure 1:
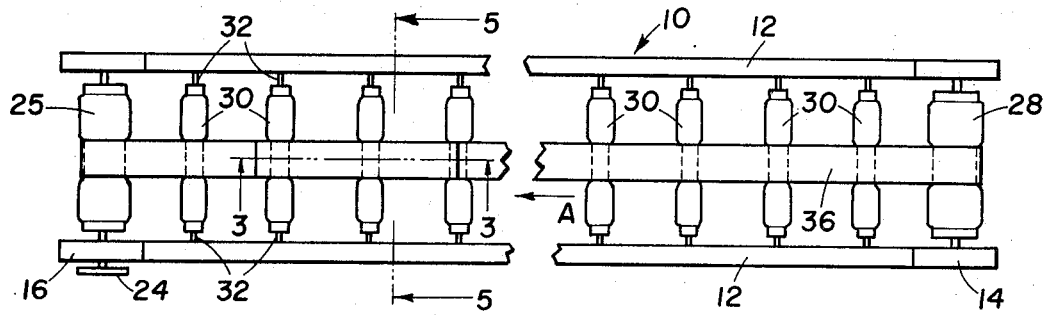
FIG. 1 is a top plan view of an accumulating transfer conveyor of the present invention with parts broken away for ease of illustration.
Figure 2:
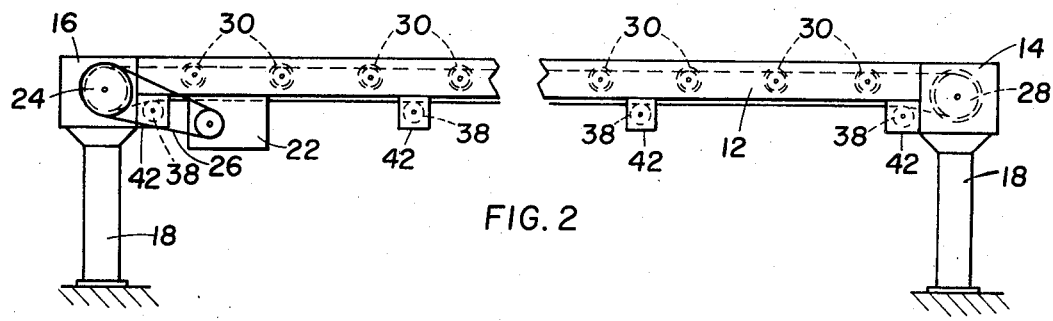
FIG. 2 is a side elevational view of the conveyor shown in FIG. 1.

Referring now in detail to the drawing, there is shown in FIGS. 1 and 2 an illustrative accumulating transfer conveyor of this invention comprising a supporting frame; generally designated 10, having opposite side rails 12 of generally channel shaped cross section. End frame members 14 and 16 are secured to opposite ends of side rails 12 and are supported by legs 18. A suitable drive motor 22, mounted on frame 10, is connected to a drive pulley 24 by means of a chain drive 26. Drive pulley 24 is drivingly connected to a drive roller 25 suitably journalled for rotation in end frame members 16 and an idler roller 28 is journalled for rotation in the opposite end frame member 14.

A series of article supporting live rollers 30 are provided, having stub shafts 32 at opposite ends thereof suitably journalled for rotation in side rails 12. Rollers 30 are provided with conventional ball bearing or like supports, the details of which are not essential to this invention and therefore are not illustrated, it being understood that the rollers are journalled with a minimum of friction.

In accord with this invention, each roller 30 is provided with a central, reduced diameter portion 34 (FIG. 5) forming a peripheral channel for receiving and guiding a drive belt 36 therein. Drive belt 36 constitutes the drive for rollers 30 and is trained about roller 25 and idler roller 28, which also have central reduced diameter portions, for movement in an endless, orbital path. Belt 36 is supported on its return run by rollers 38 having stub shafts 40 at their opposite ends suitably journalled for rotation in brackets 42 secured to the bottom of frame side rails 12.

Figure 5:
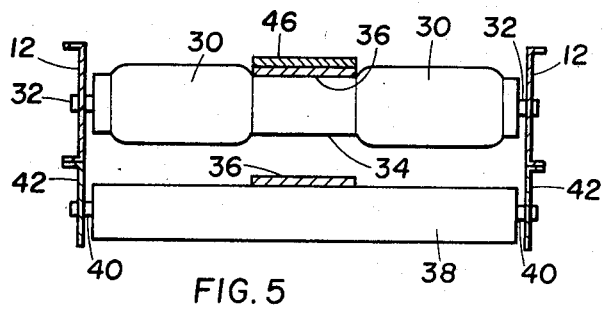
FIG. 5 is a vertical sectional view, on an enlarged scale, taken about on line 5—5 of FIG. 1.

Drive belt 36 extends along the upper surfaces of the reduced diameter portions 34 of rollers 30, as shown in FIGS. 1 and 5, and presents to these portions 34 a friction surface having a relatively high coefficient of friction sufficient to maintain rotation of rollers 30 to convey articles disposed thereon under normal operating conditions. The thickness of drive belt 36 is slightly less than the radial depth of the channel defined by the reduced diameter portion 34 of each roller 30 to prevent engagement or contact of drive belt 36 with the articles being conveyed. Endless drive belt 36 is formed of any suitable material, such as woven cotton for example and can be provided with a poly vinyl or other friction coating on the roller engaging side of the belt, if desired, to increase the coefficient of friction thereof and increase its roller rotating ability. However, the friction force applied to rollers 30 by belt 36 preferably is of a magnitude less than that normally required to overcome the inertia of a static load disposed on rollers 30 and initiate rotation thereof or to convey loads under abnormal conditions, such as loads which might be oriented askew to the rollers or where a pileup occurs. The weight of belt 36 and the resulting friction force on rollers 30 is selected so as to be sufficient normally to maintain rotation of rollers 30 and forward motion of the articles being conveyed but generally insufficient to overcome the inertia of static loads on the rollers to initiate rotation of the latter. As a result, only a minimum of hold-back force is required for product accumulation and the power requirements necessary to maintain rotation of rollers 30 under normal operating conditions is kept to a minimum.

Figure 3:
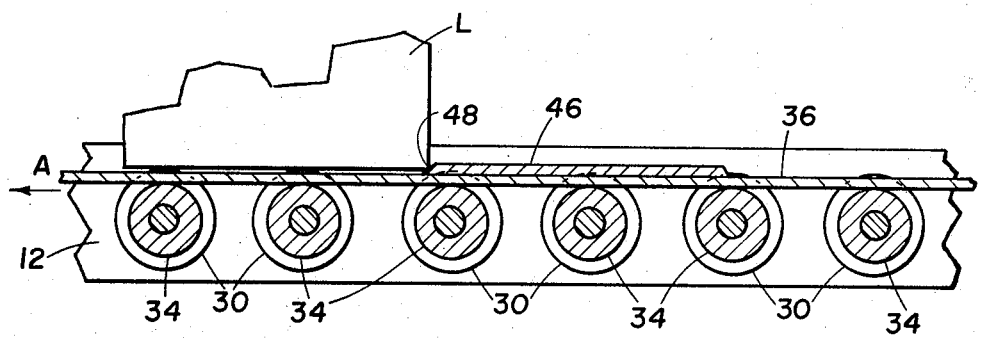
FIG. 3 is a fragmentary sectional view, on an enlarged scale, taken about on line 3—3 of FIG. 1, showing one form of pad used in conjunction with the drive belt.

A particular feature of the present invention is the provision of means carried by drive belt 36 for engaging and conveying static loads or unusually heavy and abnormal loads and stationary loads which are stuck for any reason, without however unduly increasing the hold-back force required for accumulation. Such means comprises two or more pads 46 secured to drive belt 36 on the side opposite the roller engaging friction surface and equally spaced apart on belt 36. As shown in FIG. 3, each pad 46 projects above the peripheral surfaces of the larger diameter, article engaging portions of rollers 30, on opposite sides of belt 36, and is adapted to engage behind stationary article or load L supported on rollers 30 and initiate and maintain forward movement thereof. However, if the load is accumulating and held against forward movement by suitable stop means (not shown) at the left end of the conveyor, pad 46 is so designed as to pass beneath the load, elevating it slightly as the pad 46 passes therebeneath. To this end, pads 46 have a low silhouette and project only slightly above the article engaging surfaces of rollers 30, for example on the order of one-eighth to one-fourth inch.

Pads 46 can be made of the same material as belt 36, such as woven cotton for example, and formed integral therewith or adhesively or otherwise fixedly secured to drive belt 36. In order to enable pads 46 to more readily slide beneath an accumulating load at the end of the conveyor, the upper or load engaging surfaces of pads 46 can be provided with a thin layer of an anti-friction material, such as teflon or nylon for example. However, it should be understood that pads 46 are intended to pass beneath accumulating loads only in the accumulating area and that pile-ups or static loads upstream of the accumulating area will be engaged by pads 46 and normally moved forwardly thereby.

Pads 46 are of a thickness causing them to project only slightly above the belt receiving grooves of rollers 30. The leading edges 48 of pads 46 can be sloped or otherwise shaped to slide easily beneath an accumulating load. Also, the width and lengths of pads 46 can vary, as desired.

Figure 4:
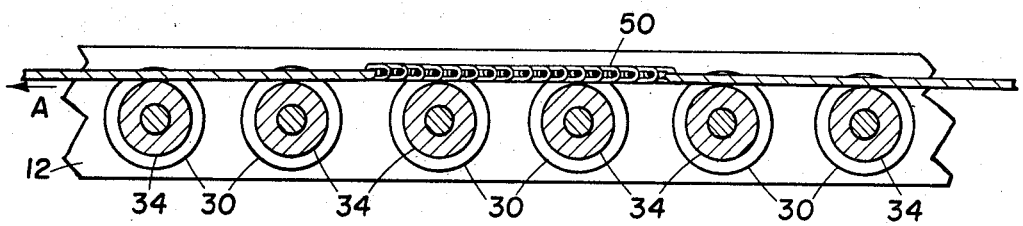
FIG. 4 is a view similar to FIG. 3, showing another form of pad used in conjunction with the drive belt.

FIG. 4 illustrates another form of pad 50 which can be separately fabricated and formed of a different material, such as woven steel for example. Pad 50 serves as a splice secured at its opposite ends to belt 36 and like pad 46 projects only slightly above the article engaging portions of rollers 30, so as to function in the same manner as pad 36. The article engaging upper surface of pad 50 also can be provided with a layer of anti-friction material, is desired.

In operation, endless drive belt 36 is driven in an irregular orbital path in the direction indicated by arrows A, by means of the drive motor 22, chain drive 26 and drive pulley 24 and is guided over rollers 30 centrally thereof in the channels defined by the reduced diameter portions 34 thereof. Belt 36 engages the upper surfaces of portions 34 to maintain them rotating under normal conditions, the frictional engagement of belt 36 against these reduced diameter portions 34 being sufficiently normally to maintain forward motion of articles being conveyed. The articles will be carried continuously along the entire length of the conveyor, the drive force imparted by belt 36 being adequate to accomplish this with normal loads. The load can be removed at the left end of the conveyor or can be accumulated by providing stop means (not shown) on the left end of the conveyor. Once rollers 30 are rotating, the weight and frictional force of drive belt 36 on portions 34 of rollers 30 is sufficient to continue to drive rollers 30 and convey the load carried thereby under normal operating conditions. In the event of a load pile-up or accumulation somewhere along the conveyor or if a load is stuck or improperly placed on the conveyor, drive belt 36 normally would not be effective to impart sufficient force to portions 34 of rollers 30 to maintain the latter rotating. However, this situation is obviated as soon as the leading edge 48 of pad 46 engages the trailing edge of the stationary load to move the same forwardly along with belt 36.

Thus, it is seen that the present invention provides a novel and simple accumulating transfer conveyor for advancing loads in an efficient manner requiring only a minimum hold-back force for accumulation. By the provision of live rollers having reduced diameter portions to receive and guide the drive belt, the full width of the conveyor is available for conveying articles. Also, a wider belt can be used to increase the frictional contact area with the rollers and increase the drive capacity whereby loads of up to fifty pounds can be conveyed by the live rollers of this invention. Where unusually heavy loads are encountered or where there is a load pile-up or improperly placed load somewhere along the conveyor upstream of the accumulating area, spaced pads secured to the backside of the endless drive belt and projecting slightly above the article conveying surfaces of the rollers are operative to engage the trailing edge of such stationary load to initiate forward movement thereof. Where the load is intended to be accumulated by stop means, the pads pass beneath the accumulated load, elevating it slightly as the pads pass thereby avoiding product damage during accumulation.

The foregoing detailed description is given by way of illustration only.

We claim:

1. A conveyor comprising: a supporting frame; a series of article conveying live rollers journalled on said frame; an endless drive member; said rollers having reduced diameter portions between the opposite ends thereof forming grooves for receiving and guiding said drive member; said drive member having one side in frictional contact with said reduced diameter portions of said rollers; the frictional contact between said drive member and said rollers being sufficient normally to maintain forward motion of articles being conveyed by generally insufficient to overcome the inertia of static loads on said rollers; and pad means carried by said drive member and projecting above the article engaging surfaces of said rollers, said pad means having a leading sloping edge surface for engagement with the trailing edge of a static load to initiate forward motion thereof and a load contacting surface extending from said leading edge surface and disposed so as to pass beneath and elevate slightly a load which is accumulating and positively held against forward movement.

2. A conveyor according to claim 1 wherein said endless drive member has a thickness less than the depth of said grooves whereby the other side of said drive member normally is spaced below the bottom of the load being conveyed.

3. A conveyor according to claim 1 wherein said pad means is formed of woven metal spliced to said drive member.

4. A conveyor according to claim 1 wherein said pad means is formed of the same material as said drive member.

5. A conveyor according to claim 1 wherein a plurality of said pad means are carried by said endless drive member in substantially equally spaced apart relation therealong.

6. A conveyor according to claim 1, wherein said belt receiving grooves are generally centrally located in said rollers.

7. A conveyor according to claim 1, further including anti-friction material on said load contacting surface of said pad means.

* * * * *

UNITED STATES PATENT OFFICE
CERTIFICATE OF CORRECTION

Patent No. 3,791,510                    Dated February 12, 1974

Inventor(s) Carl J. Milazzo, Frank J. Hohl

It is certified that error appears in the above-identified patent and that said Letters Patent are hereby corrected as shown below:

Claim 1, column 5, line 5 "by" should be changed to --but--

Signed and sealed this 17th day of September 1974.

(SEAL)
Attest:

McCOY M. GIBSON JR.                    C. MARSHALL DANN
Attesting Officer                      Commissioner of Patents